Oct. 31, 1967
S. KOBUS ETAL
3,350,696
SELECTION SYSTEM FOR ELECTRICAL CIRCUITS OR EQUIPMENTS
Filed Dec. 29, 1964
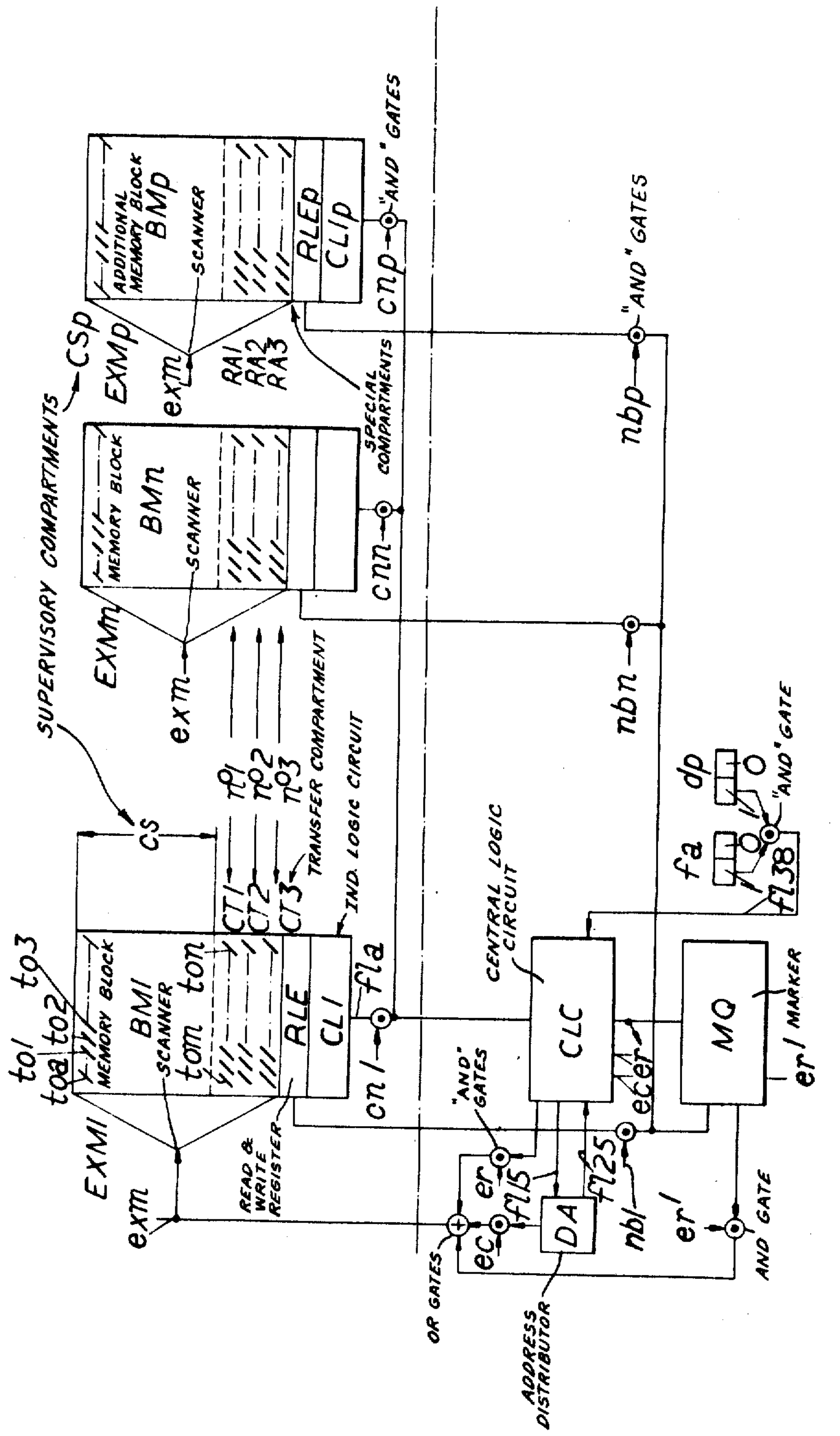

United States Patent Office 3,350,696
Patented Oct. 31, 1967

3,350,696

SELECTION SYSTEM FOR ELECTRICAL CIRCUITS OR EQUIPMENTS

Stanislas Kobus, Paris, France, and Pe Tsi Chu, Antwerp, Belgium, assignors to International Standard Electric Corporation, New York, N.Y., a corporation of Delaware Filed Dec. 29, 1964, Ser. No. 421,771
Claims priority, application Netherlands, Dec. 30, 1963, 302,737
10 Claims. (Cl. 340—172.5)

ABSTRACT OF THE DISCLOSURE

In a selection system, memory blocks serving a group of telephone lines include specialized waiting rows of the coordinate memory into which are inscribed the addresses of the ordinary compartments when they are calling. This enables the calling memory compartment to be interconnected with an equipment common to the various blocks such as a marker. Auxiliary rows are used which at any instant indicated the number of the last transfer compartment wherein a call has been recorded as well as the number of the transfer compartment corresponding to the last call served so that by an add-one process both the number of the transfer compartment to be used for the next call and that corresponding to the next call to be served may be obtained. With all the waiting rows of a waiting store having the same rank in the various memory blocks, the auxiliary row may have that rank in a supplementary block so that one may pass from the auxiliary row to a waiting row without modifying the position of the memory scanners.

This invention relates to selection systems for electrical circuits and more particularly to the memory access arrangement used in such systems.

In the copending patent application of P. Marty and J. Masure entitled "Selection System for Electrical Circuits or Equipment," Ser. No. 421,513, filed on Dec. 28, 1964, and assigned to the assignee of this application, a system has been described which is essentially constituted by at least one memory block containing a certain number of "compartments." An individual logical circuit associated to each block successively scans the various compartments in a cyclic way in order to perform simple operations on each of them. For the more complicated operation the cyclic scanning is stopped, and the individual logical circuit is replaced by a central logical circuit common to the entire installation. Such a system is particularly applicable to automatic telephone exchanges of the semi-electronic type. Each memory compartment is temporarily assigned to an equipment such as a local or feed junctor, an originating or a terminating junctor or a register.

In the above system it may be necessary to interconnect one of the memory compartments with common equipment such as a marker junctor driver, call charging device, automatic message accounting device.

In most cases, such equipment is not available and it is not possible to wait until it frees itself, since the scanning time assigned to each compartment is very short. To solve this difficulty, an assembly of specialized, so called "transfer" compartments, is provided constituting a waiting store or row and therein the addresses of the calling compartments are chronologically inscribed. The calls are served in the order of inscription. In each of the transfer compartments, memory elements are used to inscribe a mark therein, The necessity of storing several marks is apparent. For example, marks are needed to indicate an available compartment, i.e., not containing any calling compartment address. Similarly, a mark is required to indicate a busy compartment. Another mark is needed to characterize a priority compartment, i.e. containing the first call inscribed and not served. A simple examination of these marks enables the inscription and service order of the calls to be respected.

An object of the present application is to provide a waiting row memory access system that does not use an availability or busy mark.

One of the features of the invention is the association between each waiting store of a special so called "auxiliary row" compartment containing a write sequential circuit and a read sequential circuit. The examination of the "auxiliary row" enables the addresses of calling compartments to be inscribed one after the other in the order in which they present themselves and to serve these calls in the order of inscription.

Another feature of the invention is a write sequential circuit indicating at any instant the number of the last transfer compartment wherein a call has been recorded. The number of the transfer compartment to be used for the next call, can be computed from the number of the last recorded transfer department by simple addition of one unit.

Another feature of the invention is a read sequential circuit indicating at any instant the number of the transfer compartment corresponding to the last call served. The number of the transfer compartment corresponding to the next call to be served can be computed from the number indicated in the read sequential circuit by the simple addition of one unit.

Another feature of the invention is in the arrangement of the waiting store compartments in homologous positions in the various memory blocks. The auxiliary compartment is located in a supplementary block in the same position, so that it is possible to readily pass from the auxiliary compartment to one of the waiting store compartments without modifying the position of the memory scanners. A compartment number in the waiting store is a simple block number thereby economizing on memory elements in the auxiliary compartment.

Another feature of the invention is that of a memory compartment (supervision compartment) calls a predetermined common equipment (marker) before the call is stored in the waiting store, then the individual logical circuit associated with the corresponding block refers to the central logical circuit. The central logic circuit stops the cyclic scanning, directs the various scanners to the compartments of the desired waiting store and to the corresponding auxiliary compartment, connects itself to the supplementary block to read the write sequential circuit. It automatically computes the proper transfer compartments by adding one unit. It disconnects itself from the supplementary block to connect itself to the block which contains the transfer compartment. The transfer compartment is then seized and the address of the calling memory compartment staticized on the address distributor for recording in the waiting store compartment.

Another feature of the invention is that when the central logical circuit has deduced, by addition of one unit, the number of the transfer compartment wherein the call must be recorded, it causes the write sequential circuit to advance by one step as if the call had already taken place in the waiting store. This arrangement avoids a return of the central logical circuit to the auxiliary store and thus saves time.

Another feature of the invention is that when the write sequential circuit overtakes the read sequential circuit, i.e. when the logical circuit perceives that it must record the call in the next compartment to be read, it deduces therefrom that all the compartments of the waiting store are busy and commands the re-start of the cyclic scanning. The call is then served during one of the next cycles as soon as there is an available place in the waiting store.

Another feature of the invention is that when common equipment becomes available and there is at least one pending call in the corresponding waiting store, the central logical circuit is alerted. Responsive to being alerted the circuit stops the cyclic scanning, connects itself to the common equipment, directs the various scanners onto the waiting store compartments and onto the auxiliary compartment and connects itself to the supplementary block to read the read sequential circuit and to deduce therefrom, by addition of one unit, the number of the transfer compartment corresponding to the call to be served. It then disconnects itself from the supplementary block to connect itself to the block which contains the transfer compartment. The address recorded in the transfer compartment is then communicated to the common equipment which thus possess all the information necessary to communicate with the calling memory compartment.

Another feature of the invention is that when the central logical circuit has deduced, by addition of one unit, the number of the transfer compartment corresponding to the call to be served, it acts to cause the read sequential circuit to advance by one step as if the call was already served. This arrangement avoids a return of the central logical circuit to the auxiliary compartment and thus saves time.

Another feature of the invention is that when the read sequential circuit overtakes the write sequential circuit, i.e. when the logical circuit perceives that it has just read the transfer compartment corresponding to the last inscribed call, it deduces therefrom that all the recorded calls in the waiting store have been served. Then, it brings up-to-date the device waiting store bistable to indicate whether there are pending calls or not in the waiting store.

In accordance with a variant, another characteristic of the invention resides in arranging some compartments of the waiting store on homologous positions in the various memory blocks, in accordance with a "horizontal" and to use all or part of the following horizontals for the other compartments of the store, the first compartment of a horizontal being assumed to follow the last compartment of the preceding horizontal, each of the compartments being defined by two coordinates, i.e. a block number and a scanner position which are recorded, when this is necessary, either in the write or in the read sequential circuit.

Various other characteristics will become apparent from the following description, given as a non-limitative example by referring to the appended drawing which represents the general operation diagram of the system.

In the following description, the same symbols the copending patent application uses are used for the various components. Also, the elements which fulfil the same functions have been designated with the same references.

*General arrangement of the equipments*

This arrangement is substantially the same as in the aforementioned copending patent application. In the drawing a certain number of memory blocks BM1 . . . BM*n* are shown. Each memory block is associated with a read and write register RL3, an individual logical circuit CL1 and a scanner EXM. A central logical circuit CLC is common to all the blocks of the installation. The various memory scanners EXM1 . . . EXN advance step-by-step, in a cyclic manner, under the control of the address distributor DA, but they may also be set in a predetermined position by the central logical circuit CLC.

It is first of all assumed, for the sake of clearness of the explanation, that the various transfer compartments constituting a waiting row (e.g. No. 1) are distributed in the various blocks BM1 (e.g. CT1) . . . BM*n* and arranged on homologous positions. Opposite each of these waiting rows or stores, a special compartment RA1, RA2 or RA3 has been provided in an additional memory block EM*p*, called "auxiliary row." On the auxiliary row RA1, associated with the waiting store row No. 1, two information elements are found; the first concerns the identity of the last transfer compartment where an inscription has been proceeded with; the second concerns the identity of the last transfer compartment read. Such an auxiliary row thus fulfills the write and read sequential instructions. The auxiliary rows RA2, RA3, associated respectively with the waiting rows or stores No. 2 and 3, are constituted in a similar manner. Thus, it is sufficient to consult these auxiliary rows to determine the inscription and service order of the calls. The indices used in the copending patent application are no longer needed. Each transfer compartment contains only the core *tom-ton* necessary to inscribe an address of a calling supervision compartment. Of course, the additional memory block BM*p* may comprise, besides the auxiliary rows, a certain number of supervision compartments CS*p*, as do the other blocks.

*Inscription of a call in a waiting store or row*

Assume that the supervision compartment CS, located in block BM1, wants to call an equipment common to the whole or part of the installation such as the mark MQ. This calling condition is characterized by the state of the cores *to*1, *to*2. As indicated in the copending patent, these two cores furnish four combinations; the first three (01, 10, 11) each correspond to the call of a common equipment or of a predetermined type of common equipment; the last (00) indicates that there is no call. The condition of core *to*3 indicates if the call of the supervision compartment is entered or not in one of the transfer compartments of the waiting store or row; it will be assumed in what follows that the call has not yet been entered. Since the call has not been entered, core *to*3 is in its "0" condition.

Binary codes are sent by the address distributor DA towards scanner EXM1 through an "AND" gate unblocked by the condition *ec* and an "OR" gate. The signal *ec* is provided by the central logical circuit CLC. Scanner EXM1 advances step-by-step, thus scanning the various supervision compartments of the memory block BM1, in cyclic manner. When this scanner arrives opposite the calling supervision compartment CS, the information inscribed on the cores *to*1, *to*2, *to*3 is staticized on the read and write register RLE, by means of elements such as bistable circuits. The individual logical circuit CL1 controls the reinscription of this information on the cores *to*1, *to*2, *to*3. Then, verifying that the supervision compartment CS is calling marker MQ and that this call has not yet been entered in the corresponding waiting row the individual logical circuit calls the central logical circuit.

The central logical circuit CLC stops the cyclic scanning, puts a signal on wire *f*L15 and connects itself to the considered block through an "AND" gate unblocked by the signal CM1 supplied by the central logical circuit CLC. It notes the information staticized on the register RLE and deduces therefrom that the call of the supervision compartment CS has to be inscribed into the waiting store row No. 1 in cooperation with control of marker MQ (or markers MQ if there are several). The central logical circuit then controls the immediate passage of the binary core *to*3 to its "1" condition, as if the call had already been entered in the waiting row. The necessity for returning to the supervision compartment CS is thus avoided and time is saved.

To consult the auxiliary row RA1 associated with the waiting store No. 1, the central logical circuit CLC is disconnected from the memory block BM by the removal of the signal *cnl* and is connected to block BM*p* responsive to signal *cnp*. The central logical circuit suppresses condition *ec*, in order to isolate the address distributor DA from the scanner EXM1 and provides the condition *er*. By means of a convenient binary code, sent through an "AND" gate unblocked by the signal *er*, an "OR" gate and the wire *exm*, the central logical circuit CLC sets scanner EXM*p* on the auxiliary row RA1. The contents of this row is staticized on register RLE*p*, then transmitted to the central logical circuit CLC through the individual logical circuit CLO*p* and the "AND" gate unblocked by the condition *cnp*.

A memory block corresponds approximately to a traffic of 2000 subscribers' lines which results in some ten blocks for an exchange of 20,000 lines. In these conditions, four bits are sufficient to characterize the identify of a transfer compartment in the waiting row. The central logical circuit CLC thus knows the number of the last transfer compartment to receive an inscription. By simply adding one unit, the number of the transfer compartment to be used for entering the call of the supervision compartment CS is determined. The immediate inscription of this number on the auxiliary row RA1 is then controlled as if the call had already been entered in the waiting row.

The central logical circuit is disconnected from block BM*p* (suppression of condition *cnp*) to connect itself to the block containing the transfer memory to be used. It will be assumed that this block is BM1. Scanner EXM1 which receives the same binary code as EXM*n* from the central logical circuit is set on the azimuth, i.e. on the transfer compartment CT1 of the waiting row No. 1. The central logical circuit CLC notes the address of the calling supervision compartment, still staticized on the address distributor DA (connection *fl*25) and controls the inscription of this address on the cores *tom* . . . *ton* of compartment CT1. The call of the supervision compartment CS is thus entered in the waiting row.

The central logical circuit CLC is then disconnected from the considered block (suppression of condition *cnl*); it suppresses the condition *er*, re-establishes the condition *ec*, unblocks the address distributor (DA wire *fl*15) which restarts the cyclic scanner.

The successive calls originating in the supervision compartments and designated for marker MQ are inscribed one after the other in the transfer compartments of the waiting row No. 1 according to the same procedure, in the order they present themselves. The first compartment of the row is assumed to follow the last. If the last inscription has taken place in the last compartment of the row, the following inscription is to be made on the first compartment.

If the calls arrive quicker than they are handled, the sequential inscription circuit of the auxiliary row will overtake the sequential reading circuit, after a certain time. It is thus necessary before each inscription to compare the position of these two sequential circuits. When the central logical circuit perceives that it has to inscribe in the compartment which is to be read next, it deduces therefrom that all the compartments of the waiting row are busy. The inscription not being possible, it suppresses the condition *er* and re-establishes the condition *ec* so as to again set scanner EXM1 on the calling supervision compartment CS and restore core *to*3 to the "0" condition. The cyclic scanning restarts as indicated previously. When the scanner, after a complete round, returns to the calling supervision compartment CS, the individual logical circuit CL1 verifies again that this compartment calls the marker (cores *to*1 *to*2) and that the call is not yet noted (core *to*3 in its "0" state). It then starts the inscription process which has to succeed this time as there is much chance that one or more waiting store compartments are freed at this moment.

*Handling of the calls inscribed in the waiting row or store*

When marker MQ becomes available, bistable *dp* passes to its "1" condition. If there is at least a call pending in the corresponding waiting row store (row No. 1), bistable *fa* is then also in its "0" condition. In these circumstances, there is a call from the central circuit CLC (wire *fl*38). The latter stops the cyclic scanning and connects itself to marker MQ. Bistable *dp* passes to its "0" condition.

The central logical circuit CLC is then connected to the memory block BM*p* and it sets the scanner EXM*p* on the auxiliary row RA1 associated to the waiting row No. 1 in order to consult this auxiliary row and to know the number of the last transfer memory that was read out. By simply adding one unit, the number of the transfer compartment to be read is determined therefrom. For the reasons already indicated, the immediate inscription of this new number on the sequential reading circuit is commanded.

The central logical circuit CLC is disconnected from block BM*p* and is connected to that containing the transfer compartment to be read. It will be assumed that this block is BM1. One of the cores *tom* . . . *ton* of the transfer compartment CT1, the central logical circuit reads the address of the supervision compartment to be served. This address is not re-inscribed after reading and the compartment becomes available.

The address of the calling supervision compartment is transmitted from the central logical circuit to marker MQ. This address comprises two parts, one to indicate the memory block which comprises the calling compartment and the other to indicate the row of this compartment inside the block. By means of the first part of the address, marker MQ unblocks an "AND" gate by signal *nbl*, so as to have access to the read and write register RLE of the block comprising the calling compartment. The second part of the address is sent through an "AND" gate unblocked by the signal *er'* and an "OR" gate towards scanner EXM1. Signal *er'* is provided by marker MQ. Scanner EXM1 is then set on the supervision compartment CS to be served. The marker may then work with this compartment, i.e. proceed to the necessary reading and inscriptions.

When the marker has finished its task, it controls the reset to zero of the cores *to*1, *to*2, *to*3 and disconnects itself from the considered memory block (suppression of the conditions *nbl* and *er'*). Bistable *dp* returns to its "1" condition. The cyclic scanning starts again as previously indicated. However, if there are other calls to be served in the waiting row or store, bistable *fa* remains in its "1" condition; the central logical circuit CLC is again alerted and the next call is served like the first call.

As indicated when inscribing the calls in the waiting row or store, the first transfer compartment is assumed to follow the last; if the last reading has been effected on the last compartment of the row, the next read operation is done on the first compartment.

If calls are served more quickly than they are received, the sequential reading circuit of the auxiliary row will after a certain time, overtake the sequential inscription circuit. At each reading operation, the central logical circuit compares the position of these two sequential circuits. When it perceives that there is an identity between the last compartment inscribed and the last compartment read, it deduces therefrom that all the calls inscribed in the waiting row have been served and it resets bistable *fa* to zero. The availability of marker MQ no longer starts the reading procedure.

In the foregoing descriptions, it has been assumed that the transfer compartments of a same waiting row or store were arranged in homologous positions of the memory blocks, i.e. according to a same "horizontal." This arrangement is economical because a few bits are sufficient to characterize the position of a transfer compartment in a waiting row. Furthermore, the passage of a transfer compartment to the auxiliary row of the corresponding waiting store or row may be done without modifying the position of the scanners. However, if the traffic requires it, it is feasible to arrange the transfer compartment of a same waiting store even on a different horizontal. The position of a transfer compartment in the waiting store is then defined by two coordinates, one corresponding to a block number and the other to a scanner position; of course, these two coordinates have to appear on the sequential inscription circuit and the sequential reading circuit. To obtain a correct operation, it has then to be assumed that the last transfer compartment of a horizontal is immediately followed by the first compartment of the next horizontal; and that the last compartment of the waiting store is followed by the first.

It has not been deemed necessary to give detailed schematics which may be easily deduced from those of the copending patent (FIGS. 2 and 3). It is sufficient to remove in the latter the various circuits relating to the indices and to assume analogous circuits for the auxiliary rows: one has also to assume a third set of time positions for those rows.

It should be well understood that the preceding descriptions have only been given by way of a non-limitative example and that numerous varients may be realized without departing from the scope of the invention. In particular, the various numerical data has only been mentioned to facilitate the understanding of the operation and may vary for each particular case.

We claim:

1. A system for selecting particular common equipment from a plurality of common equipment, said system comprising memory blocks, said memory blocks comprising memory compartments, each of said memory compartments having an individual address, transfer compartments comprising certain of said memory compartments, sequential inscription means for sequentially inscribing the address of the calling one of said memory compartments in one of said transfer compartments in the order of presentation, means for temporarily associating said common circuits to the calling ones of said compartments in a priority order based on the order of inscription in the transfer compartments, and said sequential inscription means comprising auxiliary compartments, means associated with said auxiliary compartments containing write sequential circuits and read sequential circuits, means responsive to the operation of the write sequential circuits for sequentially inscribing the address of the calling ones of said compartments in said transfer compartments in the order of presentation and means responsive to the operation of said read sequential circuit for serving the calls in the order of inscription.

2. The selection system of claim 1, and means in said write sequential circuit for indicating at any instant the number of the last transfer compartment wherein a calling address has been recorded, in such a way that the number of the transfer compartment to be used for the next call may be deduced therefrom by simple addition of one unit.

3. The selection system of claim 1, and means in said read sequential circuit for indicating at any instant the number of the transfer compartment corresponding to the last call served, in such a way that the number of the transfer compartment corresponding to the next call to be served may be deduced therefrom by simple addition of one unit.

4. The selection system of claim 3 wherein the compartments comprise rows of memory units and wherein corresponding ones of said auxiliary compartments are in the same rows but in distinct memory blocks as the associated transfer compartments.

5. The selection system of claim 4 wherein said system comprises scanner means individual to each of said memory blocks, continuously scanning said memory blocks, central logic means for controlling said scanning means, means in said central logic means operated responsive to a called common circuit being busy for stopping the cyclic scanning and for directing the various scanners to the desired one of said transfer compartments and to the corresponding auxiliary compartment, and means for connecting the central logic means to the distinct memory block to read the write sequential circuit for deducing therefrom by the addition of one unit the number of the transfer compartment wherein the address of calling memory compartment is to be recorded, means for disconnecting the central logic means from the distinct memory block and connecting the said central logic means to the memory block containing said transfer compartment wherein said calling address is to be recorded, means for seizing the transfer compartment to cause the address of the calling memory compartment to be inscribed therein.

6. The selection system of claim 5 and means for advancing the write sequential circuit by one step responsive to the said central logic means deducing the address of the transfer compartment when said calling address is to be inscribed.

7. The selection system of claim 6, and means responsive to the write sequential circuit overtaking the read sequential circuit for causing said central logic means to re-start the cyclic scanning, avoiding use of a busy mark.

8. The selection system of claim 7 including means responsive to one of said common equipment becoming available and at least one pending call in the transfer compartment for causing said central logic circuit to stop the cyclic scanning, for connecting said central logic circuit to said available common equipment, means for causing said logic circuit to deduce from the read sequential circuit by the addition of one the number of the transfer compartment to be served, means responsive to said central logic circuit deducing said transfer compartment to be served for connecting said central logic circuit to the block containing said transfer compartment to be served for receiving the address contained in said transfer compartment to enable said central logic circuit to communicate with said calling compartment.

9. The selection system of claim 8 and means in the central logical circuit operated responsive to the deduction of the number of the transfer compartment corresponding to the call to be served, for causing the read sequential circuit to advance by one step as if the call was already served, whereby a return of the central logical circuit to the auxiliary compartment is avoided and time is saved.

10. The selection system of claim 9 and means operated responsive to the logical circuit reading the transfer compartment corresponding to the last inscribed call for indicating whether there are pending calls in the transfer compartments.

References Cited

UNITED STATES PATENTS 3,063,036 11/1962 Reach ------------ 340—172.5

ROBERT C. BAILEY, *Primary Examiner.*

R. B. ZACHE, *Assistant Examiner.*